US011318975B2

(12) United States Patent
Enomoto et al.

(10) Patent No.: US 11,318,975 B2
(45) Date of Patent: May 3, 2022

(54) NON-CONTACT POWER SUPPLY UNIT (71) Applicant: TOSHIBA TEC KABUSHIKI KAISHA, Tokyo (JP)

(72) Inventors: Hideki Enomoto, Tagata Shizuoka (JP); Kazuyuki Matsumura, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/876,324

(22) Filed: May 18, 2020

(65) Prior Publication Data

US 2021/0001910 A1 Jan. 7, 2021

(30) Foreign Application Priority Data

Jul. 2, 2019 (JP) .............................. JP2019-124030

(51) Int. Cl.
*H02J 50/40* (2016.01)
*B62B 3/14* (2006.01)
*H02J 7/00* (2006.01)
*H02J 7/02* (2016.01)

(52) U.S. Cl.
CPC .............. *B62B 3/14* (2013.01); *H02J 7/0047* (2013.01); *H02J 7/02* (2013.01); *H02J 50/40* (2016.02)

(58) Field of Classification Search
CPC ....................................................... H02J 50/90
USPC ........................................................ 320/108
See application file for complete search history.

(56) References Cited

U.S. PATENT DOCUMENTS

| 10,336,197 | B2 | 7/2019 | Kotani et al. | |
| 2007/0008068 | A1 | 1/2007 | Brice et al. | |
| 2014/0368163 | A1* | 12/2014 | Ho | H02J 50/40 320/108 |
| 2015/0112825 | A1 | 4/2015 | Konishi et al. | |
| 2019/0123587 | A1* | 4/2019 | Titov | A61G 7/0528 |
| 2019/0123598 | A1* | 4/2019 | Patmore | H02J 7/0044 |

FOREIGN PATENT DOCUMENTS

| CN | 107733015 A | 2/2018 | |
| EP | 2273444 A2 | 1/2011 | |
| JP | 2006101577 A * | 4/2006 | ................ H02J 7/00 |
| JP | 2006-217690 A | 8/2006 | |
| JP | 4469290 B2 | 5/2010 | |

OTHER PUBLICATIONS

Extended European Search Report dated Sep. 18, 2020, mailed in counterpart European Patent Application No. 20182698.9, 5 pages.

* cited by examiner

*Primary Examiner* — Edward Tso
*Assistant Examiner* — Ahmed H Omar
(74) *Attorney, Agent, or Firm* — Kim & Stewart LLP (57) ABSTRACT

A non-contact power supply unit includes connectable units. Each of the connectable units includes a cart wheel guide, a non-contact power supply device configured to perform wireless power charging of a cart, a first connector, and a second connector. The first connector is connectable to the second connector of another connectable unit and the second connector is connectable to the first connector of another connectable unit. The cart wheel guides of the connectable units are aligned with each other when connected.

20 Claims, 8 Drawing Sheets

NON-CONTACT POWER SUPPLY UNIT

CROSS-REFERENCE TO RELATED APPLICATION

This application is based upon and claims the benefit of priority from Japanese Patent Application No. 2019-124030, filed on Jul. 2, 2019, the entire contents of which are incorporated herein by reference.

FIELD

The present disclosure relates to a non-contact power supply unit, certain embodiments of which can be used for battery charging of electronic devices mounted on shopping carts.

BACKGROUND

In a retail store such as a supermarket, a shopping cart is often used. It is possible to improve customer convenience by attaching an electronic device such as a commodity registration apparatus for reading commodity information capable of identifying commodities to be purchased.

When a battery-operated electronic device is attached to the shopping cart, it becomes necessary to occasionally charge the battery of the electronic device. The charging may be performed in a non-contact manner. In this case, a non-contact power supply device is installed in the store.

However, the space that can be occupied by an installed non-contact power supply device in different stores may be different depending on the store. For example, how many carts that need to be charged by the non-contact power supply may be different depending on the store. Therefore, it is desirable to provide a non-contact power supply device for which the number of carts that can be accommodated can be changed according to particular needs of the store.

DETAILED DESCRIPTION

In general, according to an embodiment, a configurable non-contact charging cart station includes a plurality of connectable units. Each of the connectable units includes a cart wheel guide, a non-contact power supply device configured to perform wireless charging of a cart, a first connector, and a second connector. The first connector of each connectable unit is connectable to the second connectors of other connectable unit in the plurality. Likewise, the second connector of each connectable unit is connectable to the first connector of other of connectable units in the plurality. The cart wheel guides of the connectable units are aligned with each other when connected to each other first connector to second connector.

An example embodiment of a non-contact power supply unit for use as a configurable, non-contact cart charging station will now be described with reference to the accompanying drawings. The various embodiments described below are non-limiting examples of a non-contact power supply unit and the present disclosure is not to be considered limited to these particular example embodiments. The non-contact power supply unit of the present disclosure is applicable to a configurable, non-contact charging cart station, but not limited thereto. The configurable, non-contact charging cart station can be used with a shopping cart or the like equipped with a commodity registration apparatus such as those used in a retail store.

Figure 1:
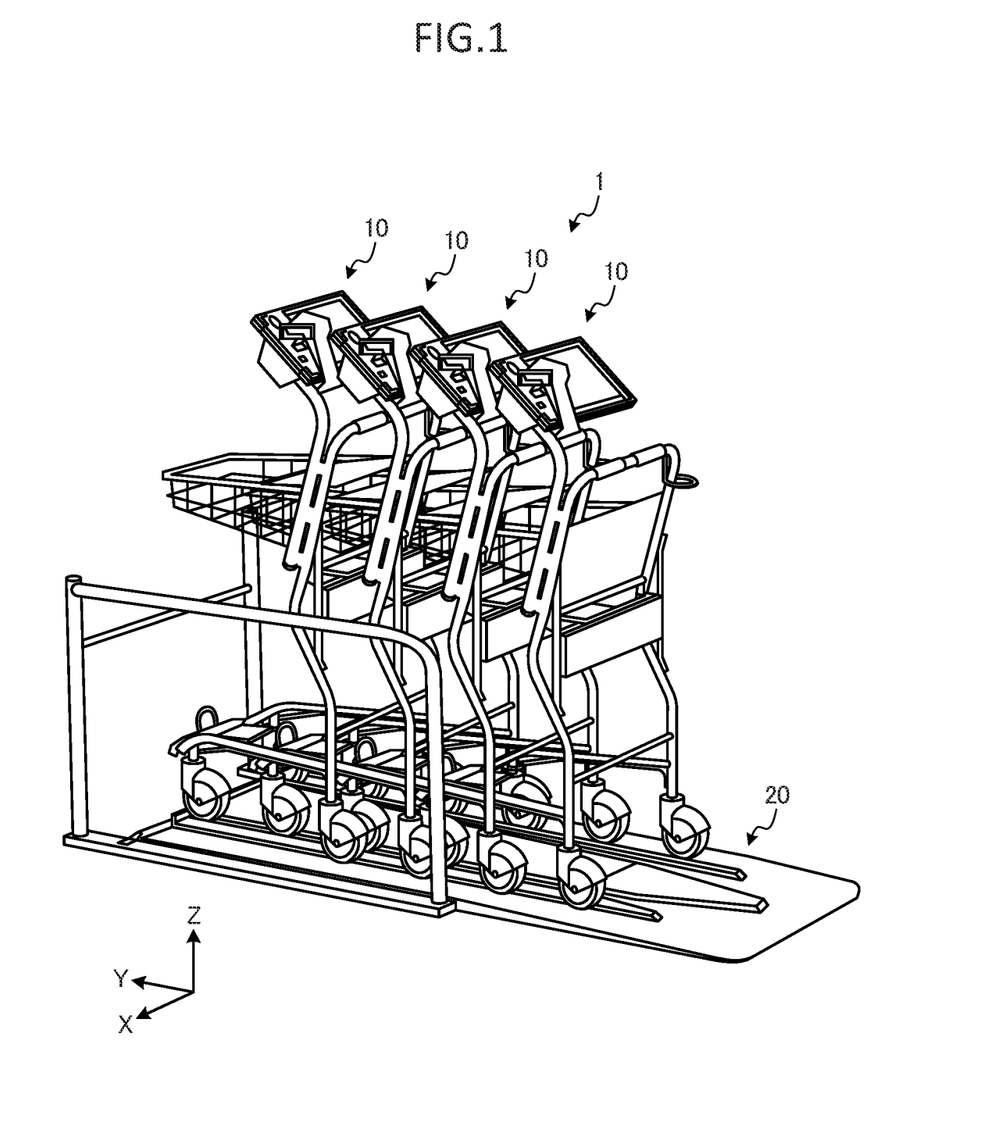
FIG. 1 illustrates a perspective view of an example of a non-contact power supply system according to an embodiment.

FIG. 1 illustrates a perspective view of an example of a non-contact power supply system 1. The non-contact power supply system 1 includes one or more carts 10 and a configurable non-contact charging cart station 20. FIG. 1 shows a case where a configurable non-contact charging cart station 20 is located at a place in a retail store.

Figure 2:
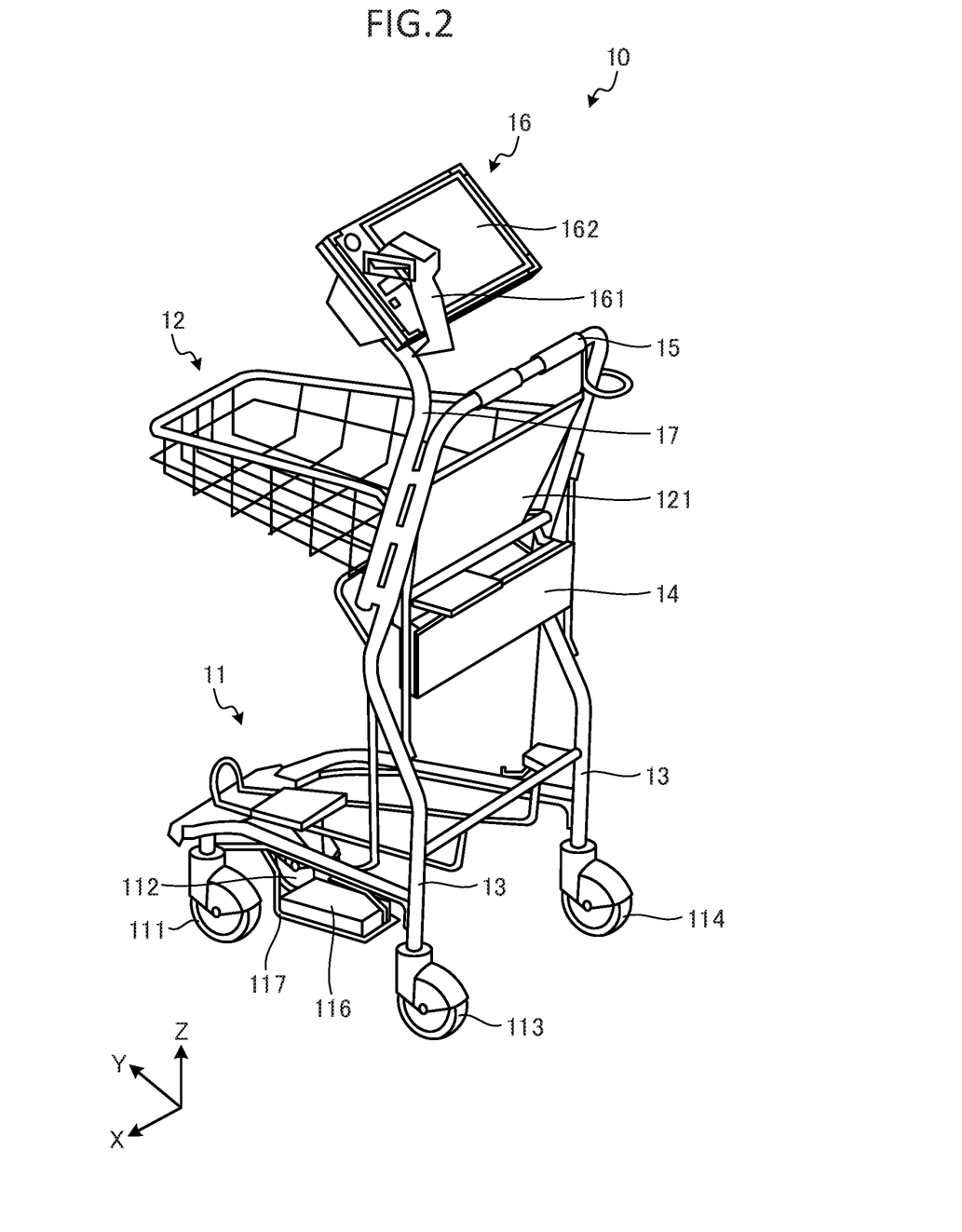
FIG. 2 illustrates a perspective view of an example of a cart.

FIG. 2 illustrates a perspective view of an example of the cart 10. In a retail store such as a supermarket, an item (commodity) which a customer selects for purchase is placed in the cart 10. The cart 10 is a pushcart or the like that the customer can move around the store while shopping.

More specifically, the cart 10 includes a base portion 11 for movement. The base portion 11 includes a pair of front wheels 111 and 112 and a pair of rear wheels 113 and 114. The spacing interval between the front wheels 111 and 112 is smaller than the spacing interval between the rear wheels 113 and 114. A mounting part 117 is disposed below the base portion 11. A power receiving unit 116, which can receive electric power from a non-contact power supply, is attached to the mounting part 117. The power receiving unit 116 is disposed substantially horizontally.

A housing part 12 is disposed above the base portion 11. The housing part 12 may be referred to as a basket part. The housing part 12 is supported by a support column 13 extending from the base portion 11. A rear side of the housing part 12 comprises a hinged (opening and closing) surface 121. As shown in FIG. 1, by inserting a housing part 12 of a cart 10 into the housing part 12 of the another cart 10, it is possible to stack/integrate several carts 10 within a relatively small area. It is noted that in some examples the cart 10 does not have to include the housing part 12 as depicted. For example, the cart 10 may instead have a basket receiving part upon which a hand-carriable commodity basket can be received/mounted as the housing part 12.

A holder 14 containing a secondary battery is disposed below the housing part 12. The secondary battery is a battery for storing the electric power received by the power receiving unit 116.

The support column 13 includes a handle portion 15 to be gripped by a customer using the cart 10. The support column 13 includes a support part 17 for supporting the commodity registration apparatus 16. The commodity registration apparatus 16 is used for registering items being purchased by the customer.

The commodity registration apparatus 16 is an apparatus for registering a commodity in a sales transaction. The commodity registration apparatus 16 includes a scanner 161 and a display unit 162. The scanner 161 reads commodity information from items for sale. For example, the scanner 161 reads commodity codes that can be identified in a bar code or the like. The display unit 162 is, for example, a touch panel display. The display unit 162 displays a commodity read by the scanner 161, for example. The commodity registration apparatus 16 is driven by using the power charged in the secondary battery stored in the holder 14.

Figure 3:
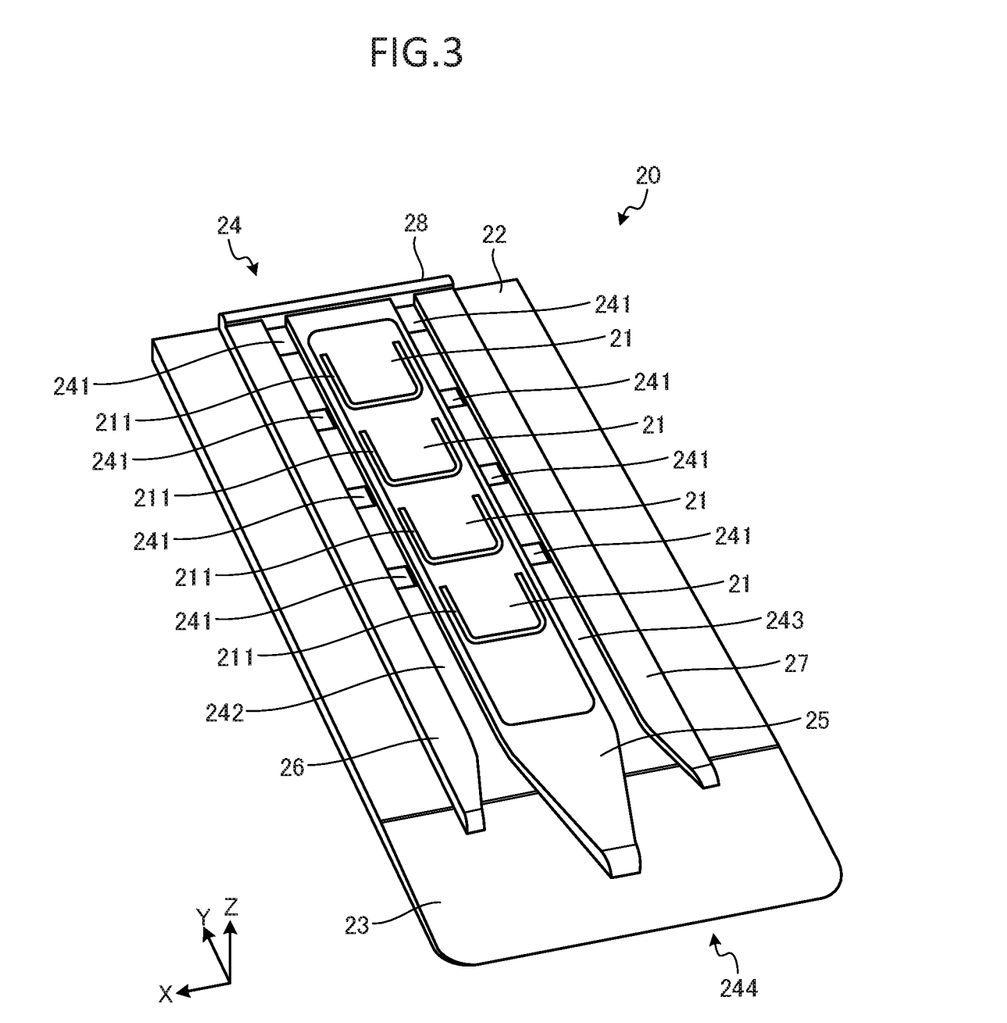
FIG. 3 illustrates a perspective view of an example of a configurable non-contact cart charging station.
Figure 4:
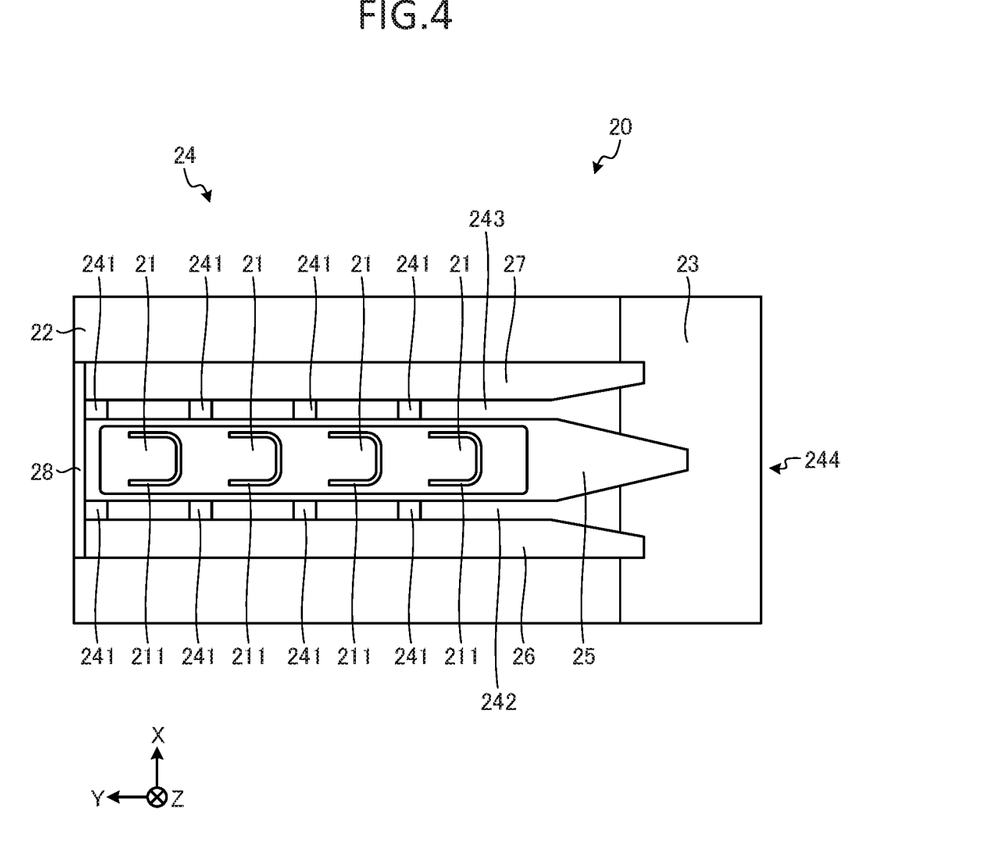
FIG. 4 illustrates a top view of a configurable non-contact cart charging station.

Next, a description will be given of the configurable non-contact charging cart station 20. FIG. 3 illustrates a perspective view of an example of the configurable non-contact charging cart station 20. FIG. 4 illustrates a top view of an example of the configurable non-contact charging cart station 20. The configurable non-contact charging cart station 20 includes a power transmitting unit 21 for transmitting electric power to a power receiving unit 116 of a cart 10 mounted thereon by non-contact power supply. The power transmitting unit 21 may be referred to as a non-contact power supply port. When the power receiving unit 116 of the cart 10 is not located at a position opposed to the power transmitting unit 21 of the configurable non-contact charging cart station 20, the power supply efficiency is deteriorated. To address this issue, the configurable non-contact charging cart station is configured such that the cart 10 can be easily arranged at a position where the power receiving unit 116 and the power transmitting unit 21 are opposed to each other. In FIGS. 1 to 5, it is assumed that the direction in which the cart 10 enters the configurable non-contact charging cart station 20 is in the Y direction.

More specifically, the configurable non-contact charging cart station 20 is covered with a housing 22. The housing 22 includes one or more power transmitting units 21. The configurable non-contact charging cart station 20 includes a light emitting part 211 around the power transmitting unit 21. The light emitting unit 211 emits light when the power receiving unit 116 is located at a position opposed to the power transmitting unit 21. Thus, the manager or the like of the retail store can identify whether or not the battery is being charged by the non-contact power supply. FIG. 3 and FIG. 4 show a configurable non-contact charging cart station 20 including a power transmitting unit 21 and a light emitting part 211.

The housing 22 of the configurable non-contact charging cart station 20 has a certain thickness to accommodate the power transmitting unit 21 therein. The configurable non-contact charging cart station 20 has a slope 23 on the entrance side of the cart 10. The slope has an inclination from the surface on which the configurable non-contact charging cart station 20 is installed to the placement unit 24 on which the cart 10 is placed. The slope 23 may be referred to as a ramp.

The placement unit 24 is provided on the upper surface of the configurable non-contact charging cart station 20. The placement unit 24 is a region in which a cart 10 having a commodity registration apparatus 16 and a power receiving unit 116 for receiving power to be supplied to the commodity registration apparatus 16 is placed. The power transmitting unit 21 is disposed substantially horizontally at a position opposed to the power receiving unit 116 in the placement unit 24, and generates a magnetic field in the vertical direction. In this way, the power transmitting unit 21 transmits power to the power receiving unit 116 of the cart 10 by non-contact power supply. As a method of non-contact power supply, various methods such as an electromagnetic induction type and a magnetic field resonance type are known, but various other types of methods can be used. In the present embodiment, the term "non-contact" refers to the power transmission being carried out wirelessly. Therefore, even if the power transmitting unit 21 and the power receiving unit 116 are in physical contact with each other at the time of power supply, regardless of whether this physical contact is intended or not, the power can be considered to be supplied in a non-contact manner as long as the power transmission is performed without connection of wires/cables between the power transmitting unit 21 and the power receiving unit 116.

In order to position the power transmitting unit 21 and the power receiving unit 116 opposite each other, the cart 10 must be placed at an appropriate position in the width direction orthogonal to the entering direction of the cart 10, that is, in the X-axis direction in the configurable non-contact charging cart station 20.

The configurable non-contact charging cart station 20 includes a central wheel guide portion 25, a first side wheel guide portion 26, and a second side wheel guide portion 27. The central wheel guide portion 25 is a convex part disposed substantially at the center of the configurable non-contact charging cart station 20. In an embodiment, the central wheel guide portion 25, the first side wheel guide portion 26, and the second side wheel guide portion 27 may be collectively referred to as a cart wheel guide. Further, the central wheel guide portion 25 extends from the entrance side of the cart 10 to the end of the placement unit 24 on which the cart 10 is placed. Further, the central wheel guide portion 25 is widened in width as it advances from the entrance side of the cart 10 to the placement unit 24. The central wheel guide portion 25 has a width substantially equal to the width from the front wheel 111 to the front wheel 112 of the cart 10 in the placement unit 24. By such a shape, the central wheel guide portion 25 restricts movement in the width direction of the front wheels 111 and 112 of the cart 10. That is, the central wheel guide portion 25 is used to position the cart 10 in the X-axis direction in the configurable non-contact charging cart station 20.

The first side wheel guide portion 26 and the second side wheel guide portion 27 are convex parts which are arranged laterally with respect to the central wheel guide portion 25 in the entering direction of the cart 10. The first side wheel guide portion 26 and the second side wheel guide portion 27 extend from the entrance side of the cart 10 to the end of the placement unit 24 on which the cart 10 is placed. Further, the first side wheel guide portion 26 and the second side wheel guide portion 27 increase in width as they advance from the entrance side of the cart 10 to the placement unit 24. In addition, the first side wheel guide portion 26 has substantially the same width as the width from the front wheel 111 to the rear wheel 113 of the cart 10 in the placement unit 24. The second side wheel guide portion 27 has substantially the same width as the width from the front wheel 112 to the rear wheel 114 of the cart 10 in the placement unit 24.

Further, the interval between the inner side of the first side wheel guide portion 26 and the central wheel guide portion 25 is substantially the same as the width of the front wheel 111. The interval from the inner side of the second side wheel guide portion 27 to the central wheel guide portion 25 is substantially the same as the width of the front wheel 112.

Further, the width from the outside of the first side wheel guide portion 26 to the outside of the second side wheel guide portion 27 is substantially equal to the width from the rear wheel 113 to the rear wheel 114 of the cart 10. By such a shape, the first side wheel guide portion 26 and the second side wheel guide portion 27 position the front wheels 111 and 112 and the rear wheels 113 and 114 of the cart 10 in the width direction.

Therefore, when the cart 10 is placed on the placement unit 24, the central wheel guide portion 25, the first side wheel guide portion 26 and the second side wheel guide portion 27 can position the cart 10 in the width direction in the configurable non-contact charging cart station 20. That is, the configurable non-contact charging cart station 20 can fix the position of the cart 10 in the X-axis direction.

The width of the gap between the central wheel guide portion 25 and the first side wheel guide portion 26 is substantially the same as the width of the front wheel 111. The front wheel 111 guided by the central wheel guide portion 25 and the first side wheel guide portion 26 runs in a gap between the central wheel guide portion 25 and the first side wheel guide portion 26. That is, the central wheel guide portion 25 and the first side wheel guide portion 26 form a first front wheel running path 242 on which the front wheel 111 of the cart 10 runs. The central wheel guide portion 25 and the first side wheel guide portion 26 forming the first front wheel running path 242 may be referred to as a first wheel guide.

Similarly, the width of the gap between the central wheel guide portion 25 and the second side wheel guide portion 27 is substantially the same as the width of the front wheel 112. The front wheel 112 guided by the central wheel guide portion 25 and the second side wheel guide portion 27 runs in a gap between the central wheel guide portion 25 and the second side wheel guide portion 27. That is, the central wheel guide portion 25 and the second side wheel guide portion 27 form a second front wheel running path 243 on which the front wheel 112 of the cart 10 runs. The central wheel guide portion 25 and the second side wheel guide portion 27 forming the second front wheel running path 243 may be referred to as a second wheel guide.

Further, the central wheel guide portion 25, the first side wheel guide portion 26 and the second side wheel guide portion 27 are widened in width as they advance from the entrance side of the cart 10 to the placement unit 24. In other words, the first front wheel running path 242 and the second front wheel running path 243 are substantially the same width as the front wheels 111 and 112 in the placement unit 24, but the portions entering the first front wheel running path 242 and the second front wheel running path 243 extend in the width direction. The central wheel guide portion 25, the first side wheel guide portion 26 and the second side wheel guide portion 27 have a convex shape.

That is, the placement unit 24 includes a first front wheel running path 242 and a second front wheel running path 243, which are the running paths of the wheels of the cart 10, in which the width in the direction orthogonal to the entering direction becomes narrower as the cart 10 advances from the entering side where the cart 10 enters to the entering direction of the cart 10. The placement unit 24 includes an entrance portion 244 of a first front wheel running path 242 and a second front wheel running path 243.

In this manner, the central wheel guide portion 25, the first side wheel guide portion 26, and the second side wheel guide portion 27 guide the front wheels 111, 112 of the cart 10. Therefore, the operator can easily drive the cart 10 along the first front wheel running path 242 and the second front wheel running path 243 by pushing the cart 10 from the entrance side of the configurable non-contact charging cart station 20.

Figure 5:
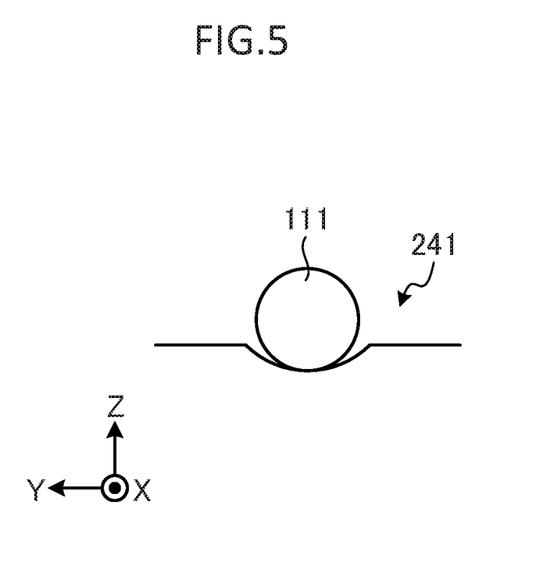
FIG. 5 illustrates a cross-sectional view of an example of a wheel positioning portion.

The first front wheel running path 242 and the second front wheel running path 243 include positioning portions 241 for fixing the position of the cart 10 in the entering direction. Each of the positioning portions 241 causes one of the wheels of the cart 10, i.e., one of the front wheels 111 and 112 to settle at a predetermined position by gravity. The positioning portions 241 may be referred to as a wheel placement region. Here, FIG. 5 illustrates a cross-sectional view of an example of the positioning portion 241. As shown in FIG. 5, the positioning portion 241 is, for example, a recessed part having a smooth curved surface.

In this way, since the positioning portion 241 has a recessed shape, the front wheels 111 and 112 will roll and eventually be disposed at bottom surface of the recessed part. Therefore, the positioning portion 241 can determine the positions at which the front wheels 111 and 112 will be located.

That is, the configurable non-contact charging cart station 20 can the position an entering cart 10 in the placement region 24.

Further, as shown in FIG. 5, the positioning portion 241 has a smooth curved surface. Therefore, when the cart 10 passes through the positioning portion 241, the load required to push the cart 10 can be reduced. The positioning portion 241 is not limited to a recessed part having a smooth curve, but may be a simple recessed part or gap having no smooth curved bottom surface. Further, the positioning portion 241 may be a convex part or a simple convex part.

Further, as shown in FIG. 1, it is possible to stack a large number of carts 10 within a small area. Therefore, the interval between the adjacent positioning portions 241 is shorter than the total length of a cart 10.

The placement region 24 of the configurable non-contact charging cart station 20 includes a stopping portion 28 for stopping the cart 10 running along the surface on the placement region 24, and the stopping portion 28 is provided on the front side of the placement region 24 in the entering direction of the cart 10. More specifically, the placement region 24 of the configurable non-contact charging cart station 20 includes a stopping portion 28 at the end of the entering direction of cart 10 in the first front wheel running path 242 and the second front wheel running path 243. The stopping portion 28 may be referred to as a wheel stop. The stopping portion 28 is a convex part extending from the outer side of the first side wheel guide portion 26 to the outside of the second side wheel guide portion 27. With such a shape, the stopping portion 28 prevents the front wheels 111 and 112 from being pushed past the placement region 24 when a cart 10 is pushed by an operator. That is, the stopping portion prevents a cart 10 from being pushed out of the placement region 24. It is noted that the stopping portion 28 is not limited to a convex part extending from the outside of the first side wheel guide portion 26 to the outside of the second side wheel guide portion 27, but also may be a projection provided in the first front wheel running path 242 or the second front wheel running path 243.

In general, the number of carts 10 required at each retail store can be different. Furthermore, the cart size and shapes as well as the cart storage location can also be different for each retail store. Thus, the size of the configurable non-contact charging cart station 20 installed at the store will generally differ depending on the situation at each store. Therefore, it would be preferable for the maximum number of carts 10 that can be charged at the same time by the non-contact power supply to be changeable to account for different circumstances at each of the different stores.

The configurable non-contact charging cart station 20 is formed by connecting a plurality of connectable units, which may be referred to as cart station units. The connectable unit includes a placement region 24 and connecting units 291, 292, 293 and 294 for connecting the placement regions 24 of other cart station units. The connecting units 291, 292, 293 and 294 may be referred to as connectors. The configurable non-contact charging cart station 20 connects the non-contact power supply units via the connection units 291, 292, 293 and 294, so that the number of the carts which can be simultaneously charged can be increased. When the connecting units 291, 292, 293 and 294 are connected, the wheel guides of the connectable units are aligned with each other. Further, the connection units 291, 292, 293 and 294 are provided at positions corresponding to the types of the connectable units.

Figure 6:
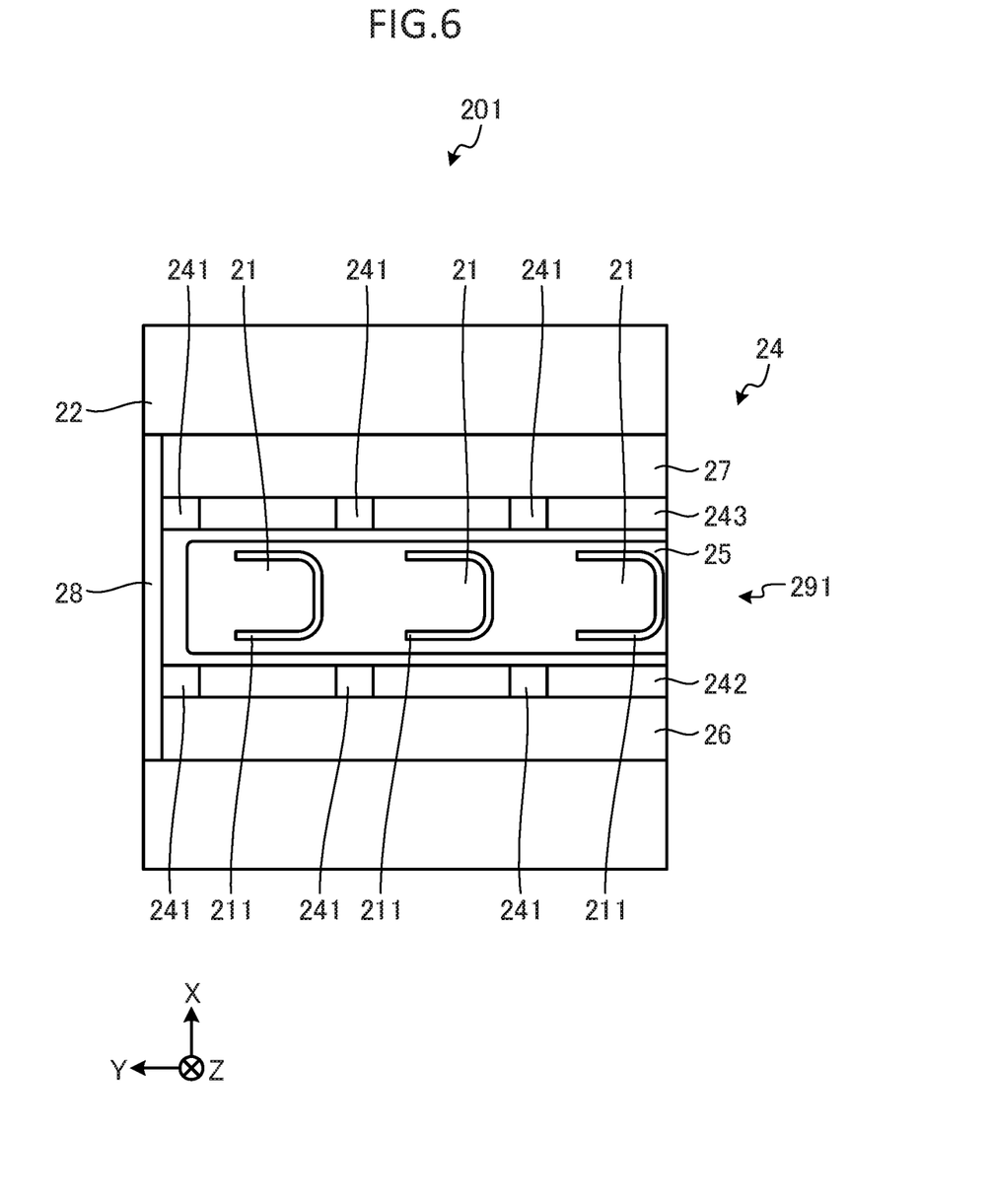
FIG. 6 illustrates a top view of an example of a top unit of a configurable non-contact cart charging station according to an embodiment.
Figure 7:
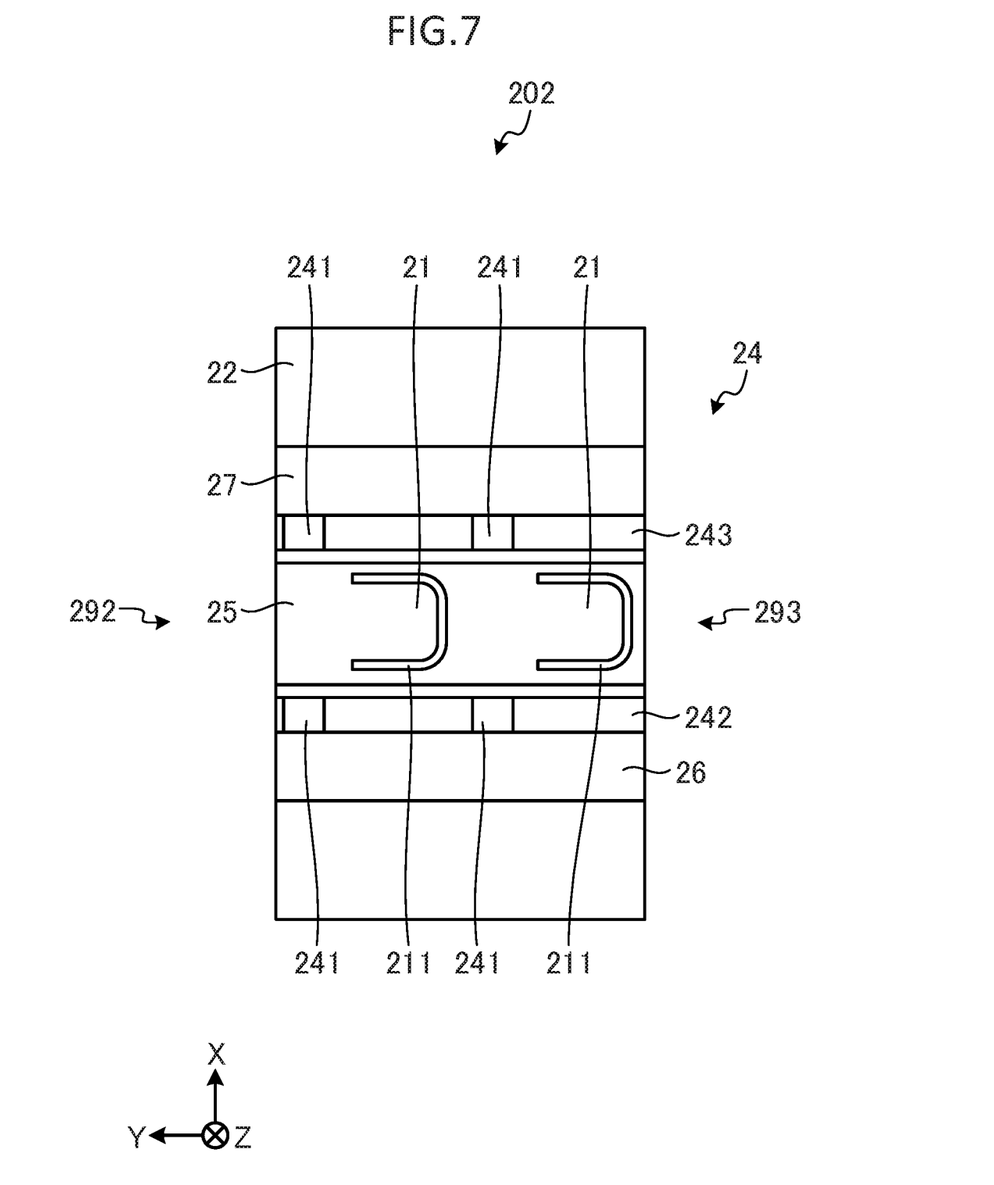
FIG. 7 illustrates a top view of an example of an extension unit of a configurable non-contact cart charging station according to an embodiment.
Figure 8:
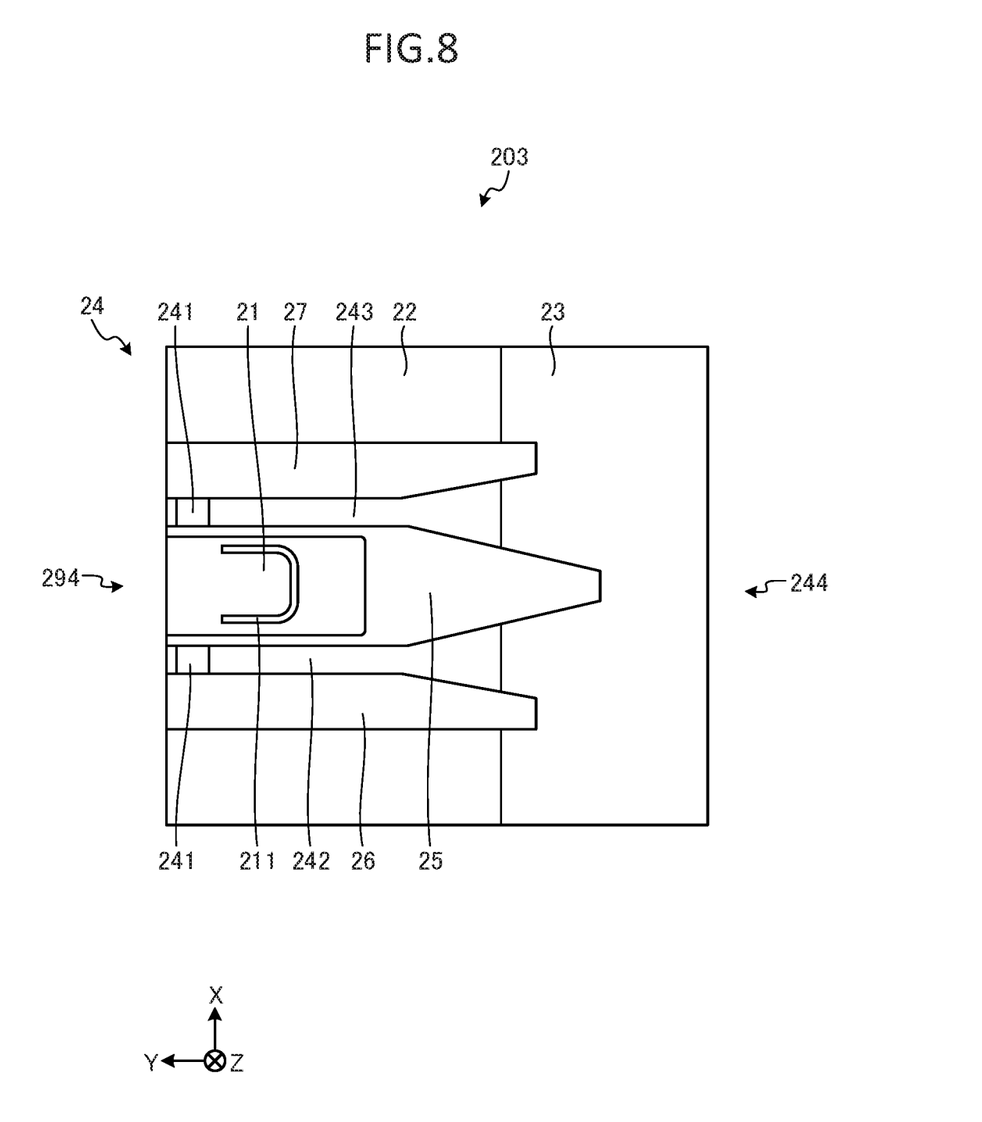
FIG. 8 illustrates a top view of an example of an end unit of a configurable non-contact cart charging station according to an embodiment.

The types of the connectable units include a top unit 201, an extension unit 202, and an end unit 203. FIG. 6 illustrates a top view of an example of the top unit 201. FIG. 7 illustrates a top view of an example of the extension unit 202. FIG. 8 illustrates a top view of an example of the end unit 203.

As shown in FIG. 6, the top unit 201 is a connectable unit that is disposed at the front end of the configurable non-contact charging cart station 20. The top unit 201 may be referred to as a terminal connectable unit. In the top unit 201, a stopping portion 28 for stopping the cart 10 running on the top surface of the placement region 24 is provided in front of the entering direction of the cart 10, and a connecting unit 291 is provided behind of the entering direction of the cart 10.

Here, the connection units 291, 292, 293 and 294 are convex parts or recessed parts on a contact surface between the placement region 24 of the own device and the other placement region 24 of the connectable unit which is different from that of the own device. When the connection units 291, 292, 293 and 294 are recessed parts, the connection units 291, 292, 293 and 294 are connected to the convex parts formed in the other connection units 291, 292, 293 and 294 provided in the non-contact power supply unit to be connected. Alternatively, the connection units 291, 292, 293 and 294 are holes formed in a contact surface between the placement region 24 of the own device and the other placement region 24 of the non-contact power supply unit which is different from that of the own device. In this case, the connection units 291, 292, 293 and 294 are connected by inserting a metal fitting or the like into the holes.

It should be noted that these connection methods are only one example, and the connection units 291, 292, 293 and 294 may connect in any manner.

Further, the connecting unit 291 of the top unit 201 can be connected to the connection unit 292 of the extension unit 202 or the connection unit 294 of the end unit 203, and the connecting unit 291 positions the rear side of the top unit 201 in the entering direction of the cart 10.

Therefore, the top unit 201 may be connected to the extension unit 202 or the end unit 203. In the top unit 201 shown in FIG. 6, there are provided three power transmitting units 21. However, the top unit 201 is not limited to three, and may include an arbitrary number of power transmitting units 21.

As shown in FIG. 7, the extension unit 202 is a connectable unit disposed in the middle of the configurable non-contact charging cart station 20. Further, the extension unit 202 can be connected to the configurable non-contact charging cart station 20 in any number. That is, in the configurable non-contact charging cart station 20, the extension unit 202 may not be connected, or the one or more extension units may be connected each other.

The extension unit 202 includes connection units 292 and 293 on the front side and the rear side of the extension unit 202 in the entering direction of the cart 10.

A connection part 292 corresponds to a connection part 291 of the top unit 201 and a connection part 293 of the other extension unit 202 different from that of its own device, and the connection part 292 is provided on the front side of the extension unit 202 in the entering direction of the cart 10.

Accordingly, the extension unit 202 can be connected to the top unit 201 and the other extension unit 202.

Further, the connection unit 293 corresponds to the end unit 203 and the connection unit 292 of the other extension unit 202 which is different from that of its own device, and the connection unit 293 is provided on the rear side of the extension unit 202 in the entering direction of the cart 10. Accordingly, the extension unit 202 can be connected to the end unit 203 and the other extension unit 202. In addition, the extension unit 202 shown in FIG. 7 includes three power transmitting units 21. However, the top unit 202 is not limited to two, and may include an arbitrary number of power transmitting units 21.

As shown in FIG. 8, the end unit 203 is a connectable unit which is disposed at the end of the configurable non-contact charging cart station 20. The end unit 203 may be referred to as a terminal connectable unit.

Moreover, a connecting unit 294 is provided on the front side of the end unit 203 in entering direction of the cart 10, and an entrance portion 244 into which the wheels of the cart 10 enter is provided on the rear side of the end unit 203 in entering direction of the cart 10.

The width of the entrance portion 244 which is orthogonal to the entering direction of the cart 10 becomes narrower and narrower as the cart 10 advances from the entrance side of the end unit 203 in the entering direction of the cart 10.

A connection unit 294 provided on the front side of the end unit 203 in the entering direction of the cart 10 corresponds to the connection unit 291 of the top unit 201 and the connection unit 292 of the extension unit 202. Accordingly, the end unit 203 can be connected to the top unit 201 and the extension unit 202. In addition, the end unit 203 shown in FIG. 8 includes one power transmitting unit 21. However, the end unit 203 is not limited to one, and may include an arbitrary number of power transmitting units 21.

In such a configuration, the configurable non-contact charging cart station 20 can increase the number of the cart 10 that can be simultaneously charged by increasing the number of connectable units. For example, in the case where the configurable non-contact charging cart station 20 for charging ten carts 10 at the same time is formed, one top unit 201, three extension units 202, and one end unit 203 may be connected.

As described above, the non-contact power supply unit such as the top unit 201, the extension unit 202, and the end unit 203 included in the configurable non-contact charging cart station 20 according to the present embodiment includes the placement region 24 on which the cart 10 is placed. The placement region 24 includes a power transmitting unit 21 which transmits power to the power receiving unit 116 by non-contact power supply. The non-contact power supply unit includes connection units 291, 292, 293 and 294 for connecting the placement regions 24 together. In general, the non-contact power supply unit can connect with any number of non-contact power supply units. Therefore, a non-contact power supply unit according to the present disclosure can vary the number of charging sites available for carts or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above embodiment, the configurable non-contact charging cart station 20 is placed in a cart place. However, the configurable non-contact charging cart station 20 may be embedded in a cart place. When the configurable non-contact charging cart station 20 is embedded in the cart place, the configurable non-contact charging cart station 20 does not have to have the slope 23 because there is no step between the configurable non-contact charging cart station 20 and the ground.

Also, the configurable non-contact charging cart station 20 may be embedded in the cart place so that the upper surface of the placement region 24 is lower than the ground surface. In this case, the configurable non-contact charging cart station 20 may have an inclined surface that descends from the ground to the placement region 24. As described above, since the configurable non-contact charging cart station 20 has the inclined surface that descends from the ground to the placement region 24, the cart 10 can be placed on the placement region 24 unless the operator intentionally pulls out the cart 10.

Further, in the above embodiment, in the configurable non-contact charging cart station 20, the first front wheel running path 242 and the second front wheel running path 243 are formed by being surrounded by the central wheel guide portion 25, the first side wheel guide portion 26 and the second side wheel guide portion 27. However, the first front wheel running path 242 and the second front wheel running path 243 may be formed by a recessed shape.

What is claimed is:

1. A non-contact power supply unit, comprising:
   a plurality of connectable units, each including:
      a cart wheel guide;
      a non-contact power supply device configured to perform wireless charging of a plurality of stackable carts, the non-contact power supply device including a first non-contact power supply unit configured to perform wireless charging of a first stackable cart and a second contact power supply unit configured to perform wireless charging of a second stackable cart stacked immediately behind the first stackable cart;
      a first connector; and
      a second connector connectable to the first connector of another connectable unit, wherein
   a first connector of a first connectable unit of the plurality is connected to a second connector of a second connectable unit of the plurality,
   a second connector of the first connectable unit is connected to a first connector of a third connectable unit of the plurality, and
   the cart wheel guides of the plurality of connectable units are aligned when the connectable units of the plurality are connected to each other.

2. The non-contact power supply unit according to claim 1, wherein, in each of the connectable units, the first connector is on a first side and the second connector is on a second side opposite to the first side.

3. The non-contact power supply unit according to claim 1, wherein, in each of the connectable units,
   the cart wheel guide includes a first wheel guide and a second wheel guide extending in parallel to the first wheel guide, and
   the first and second non-contact power supply units are provided between the first wheel guide and the second wheel guide.

4. The non-contact power supply unit according to claim 1, wherein,
   in each of the connectable units, the cart wheel guide includes a first wheel placement region shaped such that a wheel of the first stackable cart will settle thereon by gravity and a second wheel placement region shaped such that a wheel of the second stackable cart will settle thereon by gravity, and
   a distance between the first non-contact power supply unit and the second non-contact power supply unit is substantially the same as a distance between the first wheel placement region and the second wheel placement region.

5. The non-contact power supply unit according to claim 1, wherein,
   in each of the connectable units, the non-contact power supply device includes a first light emitting device configured to emit light when a non-contact power receiving unit of the first stackable cart is above the first non-contact power supply unit and a second light emitting device configured to emit light when a non-contact power receiving unit of the second stackable cart is above the second non-contact power supply unit, and
   a distance between the first non-contact power supply unit and the second non-contact power supply unit is substantially the same as a distance between the first light emitting device and the second light emitting device.

6. The non-contact power supply unit according to claim 1, further comprising:
   an entry connectable unit including:
      an entry cart wheel guide;
      a second non-contact power supply device configured to perform wireless charging of a stackable cart; and
      a third connector connectable to a second connector, wherein
   the entry cart wheel guide is aligned with the cart wheel guides of the plurality of the connectable units when the third connector is connected to the second connector.

7. The non-contact power supply unit according to claim 6, wherein the entry connectable unit includes a ramp.

8. The non-contact power supply unit according to claim 6, wherein the entry cart wheel guide includes a guide portion having a guide width that becomes narrower.

9. The non-contact power supply unit according to claim 8, wherein the guide portion is at least partially on a ramp of the entry connectable unit.

10. The non-contact power supply unit according to claim 6, further comprising:
    a terminal connectable unit including:
       a terminal cart wheel guide;
       a third non-contact power supply device configured to perform wireless charging of a stackable cart; and
       a fourth connector connectable to a first connector, wherein
    the terminal cart wheel guide is aligned with the cart wheel guides of the plurality connectable units when the fourth connector is connected to the first connector.

11. The non-contact power supply unit according to claim 10, wherein the terminal cart wheel guide includes a wheel stop.

12. A charging unit for a configurable cart station, the charging unit comprising:
- a cart wheel guide;
- a non-contact power supply device configured to perform wireless changing of a plurality of stackable carts, the non-contact power supply device including a first non-contact power supply unit configured to perform wireless charging of a first stackable cart and a second contact power supply unit configured to perform wireless charging of a second stackable cart stacked immediately behind the first stackable cart; and
- a first connector connectable to a second connector of a second charging unit for the configurable cart station, wherein
- the cart wheel guide is aligned with a cart wheel guide of the second charging unit when the first connector is connected to the second connector of the second charging unit.

13. The charging unit according to claim 12, further comprising:
- a second connector connectable to a first connector of a third charging unit for the configurable cart station, such that the cart wheel guide is aligned with a cart wheel guide of the third charging unit when the second connector is connected to the first connector of the third charging unit.

14. The charging unit according to claim 13, wherein the first connector of the charging unit is on a first side and the second connector of the charging unit is on a second side opposite to the first side.

15. The charging unit according to claim 12, wherein
- the cart wheel guide includes a first wheel guide and a second wheel guide extending in parallel to the first wheel guide, and
- the first and second non-contact power supply units are between the first wheel guide and the second wheel guide.

16. The charging unit according to claim 12, wherein
- the cart wheel guide includes a first wheel placement region shaped such that a wheel of the first stackable cart will settle thereon by gravity and a second wheel placement region shaped such that a wheel of the second stackable cart will settle thereon by gravity, and
- a distance between the first non-contact power supply unit and the second non-contact power supply unit is substantially the same as a distance between the first wheel placement region and the second wheel placement region.

17. The charging unit according to claim 12, wherein
- the non-contact power supply device includes a first light emitting device configured to emit light when the first stackable cart is above the first non-contact power supply unit and a second light emitting device configured to emit light when a non-contact power receiving unit of the second stackable cart is above the second non-contact power supply unit, and
- a distance between the first non-contact power supply unit and the second non-contact power supply unit is substantially the same as a distance between the first light emitting device and the second light emitting device.

18. The charging unit according to claim 12, further comprising:
- a ramp portion.

19. The charging unit according to claim 12, wherein the cart wheel guide includes a wheel stop.

20. The non-contact power supply unit according to claim 1, wherein the non-contact power supply device further includes a third non-contact power supply unit configured to perform wireless charging of a third stackable cart stacked immediately behind the second stackable cart.

* * * * *